FIG. I

3,362,649
MILLING PROCESS FOR SOFT WHEAT
La Verne M. Odden, Wayzata, Minn., assignor to General Mills, Inc., a corporation of Delaware
Filed Mar. 23, 1965, Ser. No. 442,103
14 Claims. (Cl. 241—11)

ABSTRACT OF THE DISCLOSURE

A soft wheat milling process in which the wheat is subjected to a hard grinding break and is classified to separate an endosperm portion which is then subjected to a high velocity impact reduction step to reduce most of the endosperm portion to patent flour. First and second clear fluors may be obtained by further processing of the remaining materials, including production of first clear flour by further impact reduction of the finer endosprem from a second hard grinding break, and production of second clear flour by reduction of the finer endosperm from a third hard grinding break. The initial hard grinding break should provide at least about 55% of the resulting product fine enough to pass through a 28W screen.

---

This invention relates to a new and improved short flow process for milling soft wheat.

In modern milling history, it has been customary to mill various types of grain by utilizing what is known as a "gradual reduction" milling process in which the grain is passed successively through a series of breaking operations. The flour stock is sifted out at various stages of the operation to obtain the different classes of product, which can, if desired, be recombined in such proportions to obtain the precise types or grades of flour desired as the end products.

Simply examining the flow charts of typical commercial flour milling operations discloses the somewhat complex nature of this gradual reduction method. The exact processes vary, depending upon the type of grain being used and the specific end product desired, etc., but generally the grain is passed through a first set of rolls (this being the first break), and the resulting stock is classified according to size, as for example, into overs or scalps, sizings, first midds, second midds and fines. The fines are collected either as patent flour or clear flour, and the other above-named classes of flour stock are each passed through a respective set of several more sets of rolls to cause further reductions, after which there is further classification. Some of this stock is taken out as patent flour or clear flour, and the rest is subjected to yet further reduction through other rolls and then subjected to yet further classification. Quite naturally, the arrangement by which the various portions of flour stock are extracted from various stages of the gradual reduction milling process has served as a basis for identifying certain classes of flour product, and thus we have become accustomed to terms such as "patent flour, first clear, second clear, etc."

As would be expected in an art as old as flour milling, the approaches have been many and varied to improve the various phases of the milling process (i.e., the tempering, breaking, classifying, bleaching, etc.), and the patent literature alone suggests the abundance of creative effort that has been directed toward improving the same. One of the results has been that the art of flour milling has reached a stage of refinement or development where not only the efficiency of output (i.e., percentage of extraction of the flour product from the berry) and the quality thereof are at a high level, but it is possible to produce with greater consistency types or grades of flour better adapted for specific uses. As might be expected, this has in turn led to greater degree of sophistication in the commercial food processes in which flour is used. That is to say, the realization of the food manufacturers that they can expect to receive with a relatively high consistency, flour of a certain predetermined quality (which means a flour having more predictable characteristics), has enabled (and to some extent induced) the various food manufacturers to produce various food products which in turn require a high quality flour of certain specified characteristics.

This sequence of developments has in a sense made further improvements in the flour milling art more difficult. If a possible improvement is such that a high percentage of flour extraction is not maintained, it is, in view of the highly competitive nature of the industry, commercially impractical. Also an improvement of one aspect of the flour cannot be at the expense of some other quality. (For example, if the type of flour produced by some new process is such that a loaf of bread or a cake made therefrom has a higher volume, the flour would still not be acceptable if the cell structure, color or some other quality of the bread or cake is in some way less than wholly desirable.) Then there is the further consideration that the character of the classes of flour extracted must be such as to conform generally to the types which conventional food processing operations (e.g., a commercial bakery) are accustomed to use, so that food products made therefrom are of a predictable quality (regardless of whether or not the flour has certain characteristics which may be regarded as "superior").

As indicated previously, the present invention is directed to the milling of soft wheat, and it may be stated as a general object of this invention to provide an improved short flow milling process for soft wheat.

Conventionally, soft wheat is milled in a manner to yield a patent flour (which is particularly well adapted for making cakes or like pastry products), a first and a second clear (these usually being used for various types of baked products such as cookies, crackers, etc.), and a remaining fraction or fractions which may come out as bran, shorts, red dog, etc. (these often being used in animal feed, various industrial uses, etc.). In the preferred embodiments of the present invention, the milling conditions are such as to yield classes of flour corresponding to those obtained by present conventional milling processes. Indeed it is one of the advantages of the present invention that it is possible to produce the types of flour product to which the industry is accustomed, and for which, therefore, there are readily available markets, and to produce the same in percentages of yield comparable to conventional flour milling procedures.

Thus it may be stated as a more specific object to provide such a short flow milling process for soft wheat in which the yield and quality of flour can be made to be at least comparable in quality and output to that produced by prior art methods, while accomplishing the same in a simplified manner, this resulting in advantages such as savings in plant space and equipment, in upkeep and in maintenance, in ease of operation, etc.

It is a further particular object that in the process of the present invention the tempering of the grain can be accomplished more conveniently in a shorter length of time, in comparison with milling processes now generally in use.

These and other objects and features of the invention will be more readily understood and appreciated from the following detailed description of the preferred embodiments thereof selected for purposes of illustration and shown in the accompanying drawings, in which.

Figure 1:
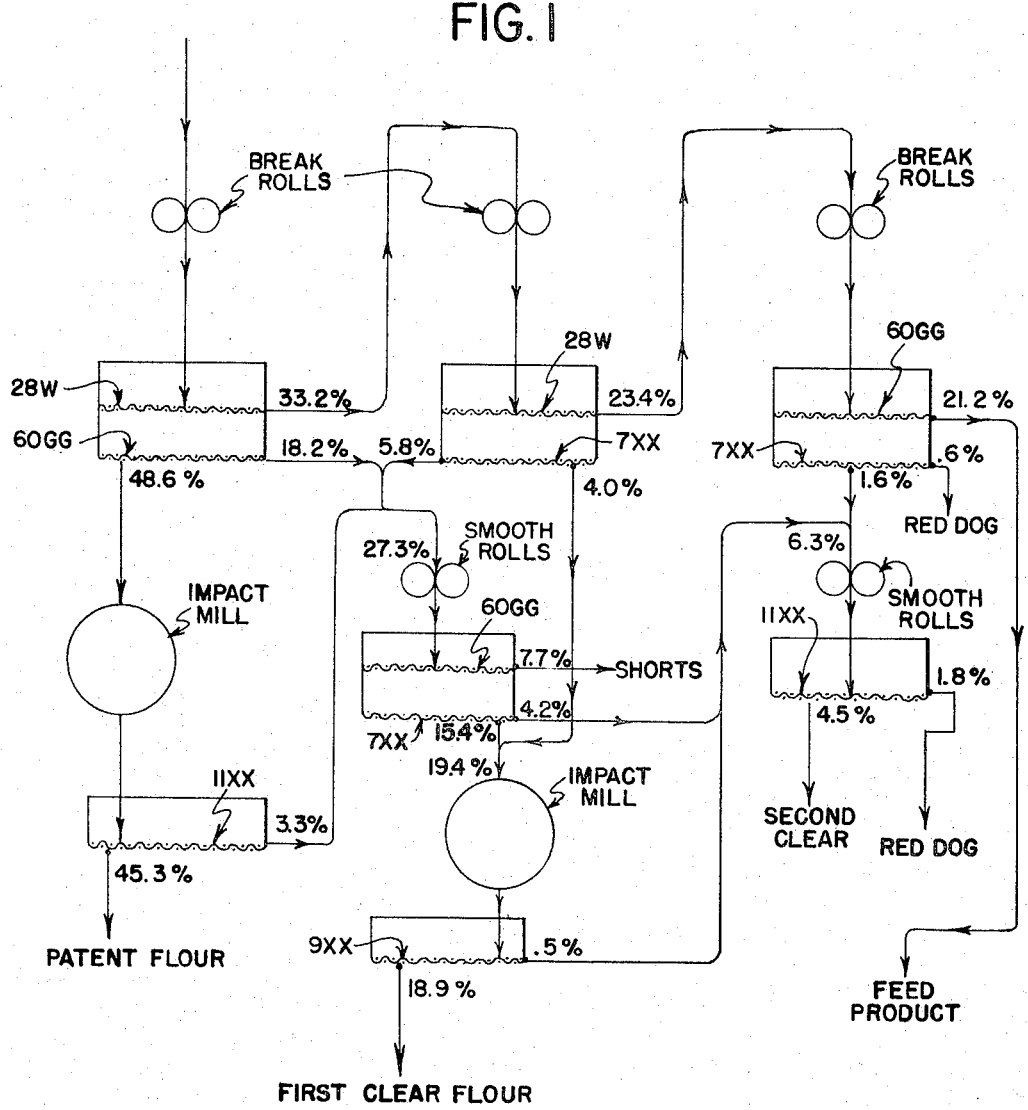
FIG. 1 is a schematic drawing disclosing the flow of a first embodiment of the present invention.

As indicated previously, the three particular embodiments disclosed herein are designed to produce flour products corresponding in quantity and quality rather closely to those which most soft wheat milling operations now produce. It is understood, of course, that the precise arrangement and operation of a flour mill is an empirical sort of thing, and changes in the number and sizes of sieves used at various stages, the hardness of the breaks, certain modifications in the flow, etc., can be made to achieve certain results. For those people having long experience in milling, the control of the milling process becomes a rather refined art, and these experienced millers are able to make certain changes or combinations of changes to modify the output of the mill in the way desired. Accordingly, it is believed that the present invention can be described most clearly to those skilled in the art by disclosing the details of the process in terms of producing flour products corresponding rather closely to conventional soft wheat milled products, with the realization that those skilled in the milling art can make the adjustments or modifications required to obtain desired variations in the end products.

The present invention can be described generally as follows: The soft wheat grains are subjected to a very "hard" grinding break (by being passed through breaking rolls), classified, and then passed through an impact mill. To obtain a soft wheat patent flour corresponding to that achieved in conventional milling processes, the product from the breaking rolls is classified to separate out a branny fraction and the remaining fine fraction is passed into the impact mill. The product from the impact mill is also classified to remove a small coarse fraction (which can be processed into first clear), with the fines being the patent flour. To produce the rest of the first clear fraction, a coarse branny fraction is taken from the product removed in the first above-mentioned classifying step and passed through breaking rolls in a manner to subject it to a very hard break, after which it is further classified with the throughs being passed through an impact mill and again classified to obtain first clear flour. In somewhat the same manner a second clear is obtained, and the residue fractions can be taken out in various ways, for example as bran, shorts, red dog, etc.

As indicated previously, the soft wheat is utilized in the present invention. The wheat is utilized in the present invention. The wheat is first cleaned and tempered. The tempering can be done in the usual manner by adding a certain amount of water to the wheat and permitting the wheat to stand in a closed environment for a period of time. However, as indicated previously, in the present invention, the tempering can be, and desirably is, accomplished in a short time in comparison with the tempering required, in conventional gradual reduction milling methods, and hence in the present invention a tempering period of about one-half to three hours has been found to be suitable.

For convenience of description, of the three embodiments disclosed herein, the actual breaking and classifying of the wheat material can be considered as being accomplished in three parts: (a) a patent flour phase, (b) a first clear phase, and (c) a second clear phase, these three phases being diagrammed at, respectively, the left, center and right portions in each of FIGS. 1, 2 and 3.

A. *Patent flour phase*

The cleaned and tempered wheat is subjected to a severe grinding break (i.e., a grinding break being one which subjects the grain to both a crushing and a shearing action) by passing the wheat one or more times through breaking rolls rotating at different speeds. The severity or hardness of the break is often conveniently determined in the flour milling industry by ascertaining the percentage of the product of the break which passes through a sieve of a predetermined size. The precise degree of severity of the break to which the wheat is subjected will depend somewhat upon the character of the soft wheat being milled and also upon the quality of flour desired as the end product. In conventional milling operations, it is usually desired to extract about 45% of the wheat as patent flour (the total weight of the wheat before milling being considered 100%). To achieve this approximate 45% extraction of patent flour in the present invention, this break should be sufficiently hard that about 65% of the product of the break passes through a 28 wire screen. With the break somewhat less hard (e.g., with about 55% passing through the 28 wire screen after this first break), a fairly good yield of patent flour can still be attained, although the yield is not as high as with a more severe break. The upper limit of the severity of the break is limited primarily by the practical considerations of the milling operation. For example, the equipment should not be over stressed by making the break excessively severe, and also with the break too severe, the bran particles tend to break up to a degree somewhat more than desired, and thus have more of a tendency to pass into the end flour products. Thus it can be seen that there is no particular advantage in making the break excessively severe.

Conventional breaking rolls can be used for this break, such as those having diameters of perhaps 7 inches, 9 inches or 10 inches, with the corrugations on the surfaces of the rolls being 16 or possibly 20 corrugations per inch. As is conventionally done in the milling art, one of the rolls in a set of breaking rolls is rotated at a faster speed than the other, speed ratios of about 2½:1 being found quite desirable. This speed ratio, can, of course, be varied, this being known in the art.

The product from this hard break is then classified to remove a branny portion (this comprising about 50% or slightly more than 50% by weight of the total wheat product), and the fines (i.e. the finer first break endosperm portion or throughs) that remain are put through an impact mill. As shown in each of the accompanying drawings, this branny portion is separated out as a more coarse branny portion or fraction and a fine or less coarse branny portion or fraction, the main purpose of this being to facilitate the subsequent processing of this branny portion or fraction in the second phase of the process (i.e., the first clear phase). As shown in each of the accompanying drawings, 28W screen is approximately the proper size to separate out the coarse branny fraction, and a screen of approximately 60GG serves well to sift out the fine branny fraction.

The throughs from this first classification (in each of the herein disclosed embodiments, this being that fraction which passes through the 60GG screen) are put through an impact mill to cause a further reduction of the same. There are, of course, many types of impact mills, and an impact mill which has been found suitable for this purpose is a pin mill of the type produced by Alpine Company, Kolloplex Type No. 160Z. In this mill, there are two circular, parallel plates which face one another, and each plate has several concentric circular rows of pins extending towards the other plate, with the rows of pins on one plate reaching between a proximate pair of rows on the other plate. One plate is fixed while the other plate is rotated so that each proximate pair of rows of pins (one row from each plate) moves with respect to the other. The material to be milled is fed into the center of the mill at a location between the two plates, and as it flows outwardly to the periphery of the plates, it is subjected to a plurality of impacts against the pins, after which it passes out an exit opening of the mill. Quite good results have been obtained when the mill is operated at a speed so that the outermost set of pins has a peripheral speed of about 400 to 450 feet per second. At speeds of about 300 feet per second, the yield of the patent flour produced begins to fall off somewhat. In general it may be said that the product should be impacted with a relatively high velocity.

Most all the product from the impact mill can be extracted as patent flour. However, this product is sifted to remove the coarser impacted fraction, i.e. whatever branny and/or coarse particles remain, this being conveniently done by passing the product from the impact mill through an 11XX screen. The throughs of this screen are a patent flour of good quality.

B. *First clear phase*

The next phase of the milling operation may be described generally as processing the portions or fractions taken out during the first phase and producing from these a first clear flour.

The more coarse branny portion or fraction is subjected to a further hard break in much the same manner as the original wheat berries are subjected to the initial hard break. Naturally, since in the first break a good portion of the endosperm has already been removed from the bran, the percentage of flour extraction from the product of this second break will be substantially less than that taken after the first break. In general, it may be stated that this second break should be of such a severity that of the product therefrom, about 30% will pass through a 28W screen. (This percentage of extraction will of course vary somewhat depending upon the severity of the first break and the percentage of product extracted as the first coarse branny fraction.)

The product of this second break is then processed in much the same manner as the product from the first break. That is to say, it is classified to separate out a branny portion (which is desirably separated out in a manner to have a more coarse second break branny fraction and a less coarse second break branny fraction), with the fine second break through fraction being passed through a second impact mill. Practically all the product from this second impact mill is taken out as first clear flour, but is first passed through a sieve (e.g., a 9XX or a 10XX) to separate out whatever branny and/or coarse material remains.

To make up the rest of the first clear flour, the fine branny fractions of the first and second break classifying steps and the overs sifted out from the product from the first impact milling are passed through a set of smooth rolls and then further classified. The primary purpose of passing this material through the smooth rolls is to flatten out whatever bran particles remain, and also to knock loose to some degree the endosperm which has not yet been separated from the bran particles.

The product from the smooth rolls is subjected to an intermediate classifying step in a manner to take out a first coarse reduced fraction as shorts and a second middle reduced fraction which passes into the third phase of the process to become second clear flour. A 60GG screen serves to sift out the coarse fraction which is shorts, and a 7XX screen is suitable to separate out the middle fraction which goes to the second clear phase of the operation. The throughs of the 7XX screen (i.e.; a fine reduced endosperm fraction) are put through the second impact mill (in a manner described hereinbefore with reference to the first impact mill) along with the throughs taken from the classification after the second break, and sifted to become first clear.

Figure 3:
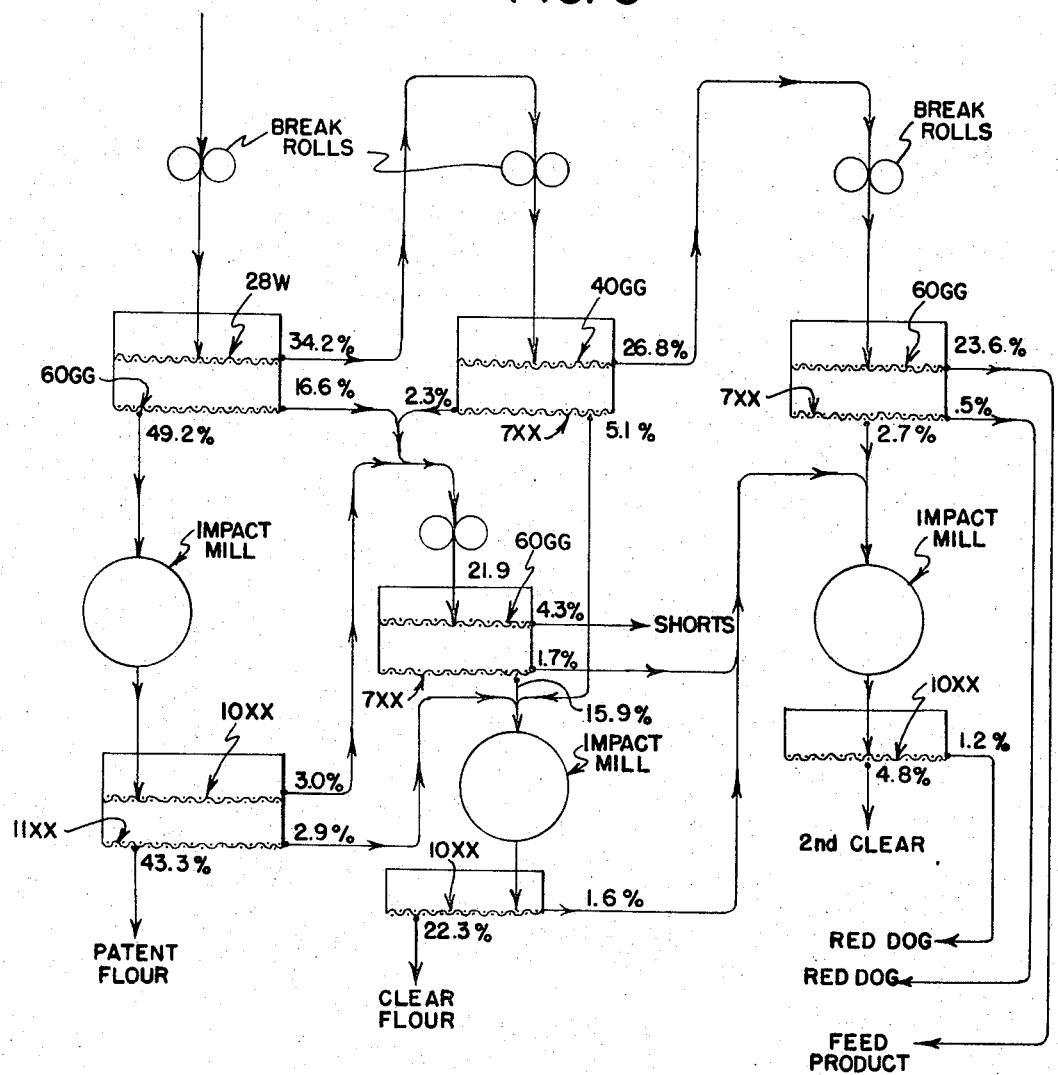
FIG. 3 is a schematic drawing disclosing the flow of a third embodiment of the present invention.

A variation of these last described steps is shown in FIG. 3, wherein the flour from the impact mill in the first phase of the operation has two fractions sifted out, a first fraction which is retained on a 10XX screen, and a second fraction which passes through the 10XX screen but is retained on an 11XX screen. The former (i.e., coarser impacted) fraction is passed through smooth rolls and classified and impacted as previously described, but the finer second or intermediate impacted fraction (i.e., that portion retained on the 11XX screen) is passed directly into the second impact mill.

C. *Second clear phase*

In the first and second phases of this process, about 65% of the total wheat product is extracted as patent flour and first clear flour. It is possible to extract a further approximate 5% as second clear, and depending upon the particular market conditions prevailing, it may well be desirable to extract this second clear fraction. If not, the 35% of product separated out during the first clear phase could be thrown together as a feed product.

However, on the assumption that this latter course is not taken, the coarse branny fraction from the second phase could be taken off as an end product (e.g., a feed product). However, it also can be passed through a third set of breaking rolls in a manner to be subjected to a hard break (as disclosed hereinbefore) and then further classified. This third break should be of such a severity that about 10% of the product therefrom will pass through a 60GG screen. (However, this will vary somewhat, depending upon the degree of extraction in the first and second phase.) The product from this third break is classified to obtain a fine third break through fraction (e.g., that passing through a 7XX screen), which is passed through a set of smooth rolls and then passed through an 11XX screen, with the through going through further processing to obtain second clear. The overs of this 11XX screen (i.e. a finer third break branny fraction) can be taken out as red dog.

The manner in which the product from the third break is classified will depend upon the classes of products desired. By passing this product immediately through a 24W screen a bran fraction can be extracted; that portion passing through the 24W screen and retained on a 60GG screen can be taken out as shorts, while that portion passing through the 60GG screen and retained on a 7XX screen can be taken out as red dog. Or, as shown in the accompanying drawings, the 24W screen can be eliminated, and the entire coarser third break branny fraction retained on the 60GG screen can be taken off as feed.

Figure 2:
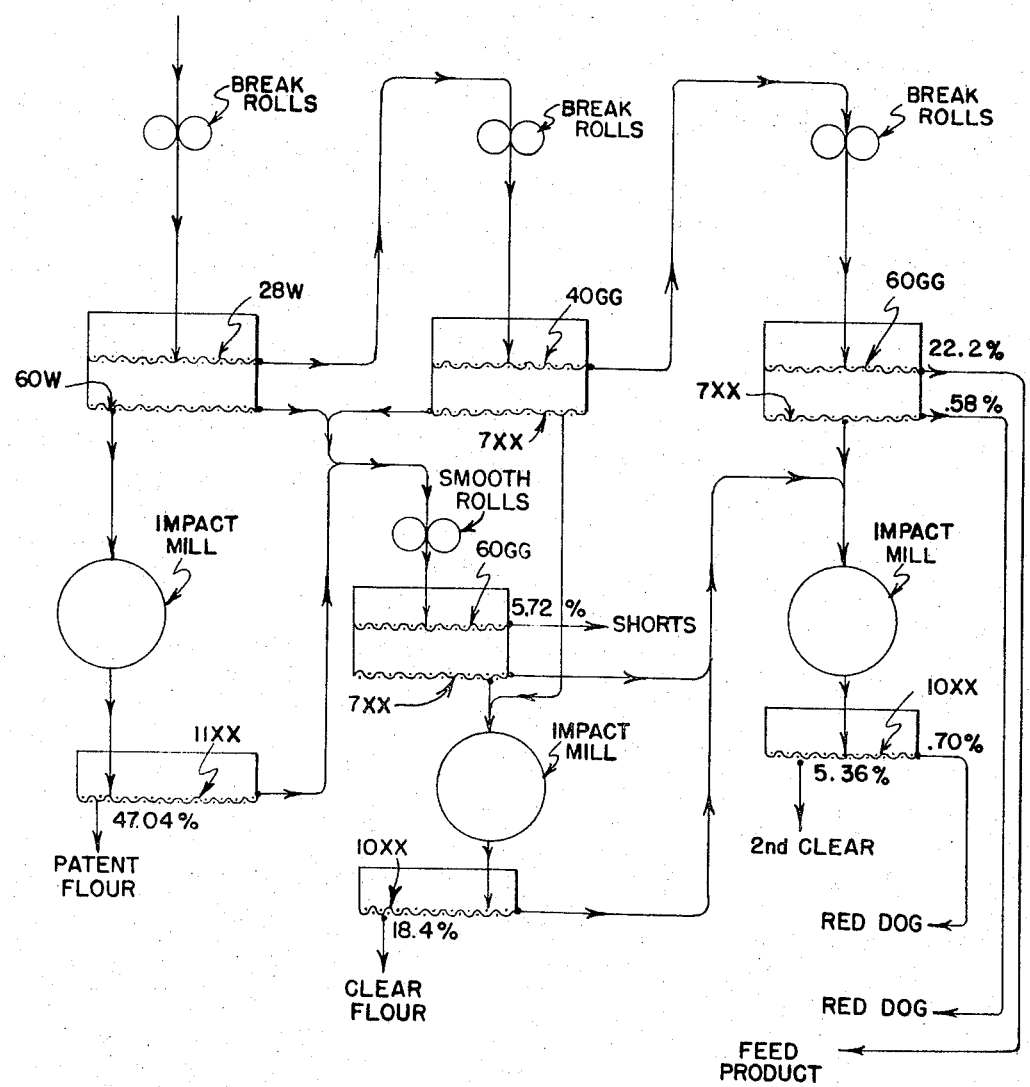
FIG. 2 is a schematic drawing disclosing the flow of a second embodiment of the present invention.

With reference to the second phase of the process, that portion of material which is not taken out as the coarse branny fraction or shorts or first clear flour is moved over to the third phase and passed through a set of smooth rolls and then passed through a second clear flour classifying step on an 11XX screen. The throughs come out as second clear flour, while the overs are taken out as red dog. A variation of this last described step of the process is shown in FIGS. 2 and 3, wherein this material is passed through a third impact mill before being classified and coming out as second clear. As shown in the extraction percentages in FIGS. 2 and 3, this results in a somewhat higher yield of second clear flour.

The invention will be disclosed with more particularity in the following examples:

EXAMPLE I

A soft wheat was tempered for ½ hour at 13% moisture and then for ¾ hour at 14% moisture, and then passed throcgh a pair of Allis break rolls, each having 20 corrugations to the inch, with the rolls counter rotating at a differential speed of a ratio of 2½:1, in a manner to subject the product to a hard break as indicated hereinbefore. The product from this break was then processed according to the flow diagram of FIG. 1, with the percentages of extraction being indicated on that diagram. A Kolloplex pin mill, Model No. 160Z was utilized for the impact milling steps, the mill being operated at 19,000 r.p.m.

The patent flour extracted was analyzed and found to contain the following:

| | Percent |
|---|---|
| Moisture | 11.4 |
| Protein | 8.6 |
| Ash | .38 |
| Fat (AH) | 1.2 |
| Starch damage | 4.4 |

EXAMPLE II

Generally the same process was followed as in Example I, except that the wheat was tempered for 2½ hours at 14% moisture and then for ½ hour at 14½% moisture, and was processed according to the flow diagram of FIG. 2, with the percentages of extraction being indicated on FIG. 2.

EXAMPLE III

The same process was followed generally as in Example I, except that the soft wheat was tempered for 1 hour at 14.7% moisture content and was processed according to the flow diagram of FIG. 3, with the percentages of extraction being indicated on FIG. 3.

It should be understood that the foregoing is merely illustrative of certain embodiments of the invention and many variations may be made by those skilled in the art without departing from the spirit and scope of the invention.

I claim:

1. A process for milling soft wheat, comprising:
   (a) subjecting said soft wheat to a hard grinding break such that at least about 55% of the resulting product is able to pass through a 28W screen,
   (b) subjecting the product from said hard grinding break to a first break classifying step to provide at least one coarser first break branny portion and a finer first break endosperm portion,
   (c) subjecting said finer first break endosperm portion to an impact reduction step at relatively high impact velocities essentially equal to those obtained in a rotating pin mill having a peripheral pin speed of at least about 300 feet per second and thereby reducing most of the impacted portion to patent flour, and
   (d) subjecting the material resulting from said impact reduction step to a patent flour classifying step to separate said material into a patent flour fraction and at least one coarser impacted fraction.

2. The process as recited in claim 1, wherein said coarser impacted fraction is subjected to a grinding reduction step, which flattens remaining bran particles and lossens further endosperm from bran, and is then subjected to an intermediate classifying step to provide a fine reduced endosperm fraction and at least one coarse reduced portion thereof, said fine reduced endosperm fraction being subjected to a further impact reduction step, thereby further reducing most of said fine reduced endosperm fraction to finished flour size, and said impacted fine portion being subjected to a first clear flour classifying step to separate the flour as a first clear flour fraction.

3. The process as recited in claim 1, wherein the patent flour classifying step separates both a coarser and an intermediate impacted fraction from the patent flour fraction, and in which said intermediate impacted fraction is next subjected to a further impact reduction step and then to a first clear flour classifying step to remove the finer impacted particles therefrom as first clear flour, and in which said coarser impacted fraction is subjected to a grinding reduction step, which flattens remaining bran particles and loosens further endosperm from bran, and is then subjected to an intermediate classifying step to separate a fine reduced endosperm fraction, said fine reduced endosperm fraction then being fed to said further impact reduction step.

4. The process as recited in claim 1, wherein the first break classifying step provides a less coarse branny portion and a more coarse branny portion, said more coarse branny portion is subjected to a second hard grinding break and then to a second break classifying step to provide a more coarse second break branny fraction, a less coarse second break branny fraction and a fine second break through fraction, and in which the less coarse branny portion from the first break classifying step and the less coarse second break branny fraction are both subjected to a grinding reduction step, which flattens remaining bran particles and loosens further endosperm from bran, and are then subjected to an intermediate classifying step to separate at least a coarse reduced fraction and a fine reduced endosperm fraction, said fine reduced endosperm fraction and said fine second through fraction being then subjected to a further impact reduction step, thereby further reducing most of said impacted material to finished flour size, and said impacted material being subjected then to a first clear flour classifying step to separate the finer impacted material as first clear flour.

5. The process as recited in claim 1, wherein the first break classifying step provides a less coarse branny portion and a more coarse branny portion, said more coarse branny portion is subjected to a second hard grinding break, and said less coarse branny portion is subjected to a grinding reduction step, which flattens remaining bran particles and loosens further endosperm from bran, after which it is subjected to an intermediate classifying step to produce at least a coarse reduced fraction as shorts and a fine reduced endosperm fraction, said fine reduced endosperm fraction being subjected to a further impact reduction step, thereby reducing most of said fine reduced endosperm portion to finished flour size, and subjecting said impacted fine reduced portion to a first clear flour classifying step to provide a finer impacted fraction as first clear flour and a coarser impacted stock portion.

6. The process as recited in claim 5, wherein the intermediate classifying step also separates out a middle reduced fraction, and at least one of said middle reduced portion and said coarser impacted stock portion is still further reduced and classified to obtain second clear flour.

7. The process as recited in claim 6 in which said middle reduced portion and said coarser impacted stock portion are both combined and still further reduced and classified to obtain second clear flour.

8. The process as recited in claim 6 in which the still further reduction step consists of a third impact reduction step.

9. The process as recited in claim 1, wherein the first break classifying step provides a less coarse branny portion and a more coarse branny portion, said more coarse branny portion being subjected to a second hard grinding break and then to a second break classifying step, to separate out a second break branny portion from a fine second break through fraction, and said fine second break through fraction is subjected to a further impact reduction step and then to a first clear flour classifying step to produce a first clear flour.

10. The process as recited in claim 9, wherein the second break classifying step separates said branny portion into more coarse and less coarse second break branny fractions, and the less coarse second break branny fraction is subjected to a grinding reduction step, which flattens remaining bran particles and loosens further endosperm from bran, and is then subjected to an intermediate classifying step to produce a fine reduced endosperm fraction which is subjected to said further impact reduction step and first clear flour classifying step.

11. The process as recited in claim 10, wherein the more coarse second break branny fraction is further processed to obtain a second clear flour.

12. The process as recited in claim 9, wherein the second break classifying step provides both a more coarse second break branny fraction and a less coarse second break branny fraction, and the more coarse second break branny fraction is subjected to a third hard grinding break, and then to a third break classifying step to separate out at least one coarser third break branny fraction and a fine third break through fraction, said fine third break through fraction being further processed to provide a second clear flour.

13. The process as recited in claim 12, wherein the fine third break through fraction is subjected to a final reduction step and then to a second clear classifying step to provide a second clear flour.

14. The process as recited in claim 13, wherein the final reduction step is an impact reduction step.

References Cited

UNITED STATES PATENTS

| | | | |
|---|---|---|---|
| 405,506 | 6/1889 | Ritter | 241—10 |
| 716,920 | 12/1902 | Mitchell | 241—10 |
| 1,784,762 | 12/1930 | Smith | 241—11 |
| 2,464,212 | 3/1949 | Carter | 241—19 X |

FOREIGN PATENTS

| | | |
|---|---|---|
| 674,263 | 1929 | France. |
| 144,903 | 1955 | Netherlands. |

WILLIAM W. DYER, JR., *Primary Examiner.*

R. J. ZLOTNIK, *Assistant Examiner.*